United States Patent
Zauner et al.

(10) Patent No.: US 7,939,779 B2
(45) Date of Patent: May 10, 2011

(54) METHOD FOR THE LASER MACHINING OF COATED SHEETS

(75) Inventors: Daniel Zauner, Ballendorf (DE); Claus-Dieter Reiniger, Remshalden (DE); Wolfgang Becker, Ulm (DE); Klaus Goth, Sindelfingen (DE); Mike Paelmer, Niefern-Oeschelbronn (DE)

(73) Assignee: Daimler AG, Stuttgart (DE)

( * ) Notice: Subject to any disclaimer, the term of this patent is extended or adjusted under 35 U.S.C. 154(b) by 711 days.

(21) Appl. No.: 10/526,989

(22) PCT Filed: Sep. 3, 2003

(86) PCT No.: PCT/DE03/02927
§ 371 (c)(1),
(2), (4) Date: Sep. 26, 2005

(87) PCT Pub. No.: WO2004/024385
PCT Pub. Date: Mar. 25, 2004

(65) Prior Publication Data
US 2006/0138101 A1    Jun. 29, 2006

(30) Foreign Application Priority Data

Sep. 5, 2002   (DE) .................................. 102 41 593

(51) Int. Cl.
*G02B 5/00* (2006.01)
(52) U.S. Cl. ........... 219/121.61; 219/121.6; 219/121.65; 219/121.66; 219/121.73; 219/121.74
(58) Field of Classification Search ............... 228/173.6; 219/121.73; 427/508, 553, 554, 586, 596
See application file for complete search history.

(56) References Cited

U.S. PATENT DOCUMENTS 5,104,032 A  *  4/1992  Spies et al. ................. 228/173.6

(Continued)

FOREIGN PATENT DOCUMENTS
EP          44 07 190 A1     9/1995
(Continued)

OTHER PUBLICATIONS

JP 2002-178178 A, Jun. 2002, Fujimoto et al—Machine Translation Document Listed on IDS.*

(Continued)

*Primary Examiner* — Mark H. Paschall
*Assistant Examiner* — Brian Jennison
(74) *Attorney, Agent, or Firm* — Patent Central LLC; Stephan A. Pendorf

(57) ABSTRACT

With many coated sheets, in particular zinc-coated sheets as used in the automobile industry, the coating material has a much lower boiling point than the material of the sheet. On welding said sheets together the above leads to explosive evaporation of coating material which seriously affects the quality of the connection. In order to improve the quality of the connection it has already been disclosed that narrow gaps between the sheets can be produced by means of spacers, through which the coating material can escape. The spacers can be produced for example, by means of laser bombardment of the sheets. A disadvantage is the relatively long time necessary for machining, which causes large costs in particular for serial production. The aim of the invention is to reduce the time necessary for machining the sheets whilst at least maintaining, preferably improving the quality of the machining. Said aim is achieved, by means of a method, whereby the laser beam is deflected onto the surface by means of a scanner device. A scanner device is a particularly rapid and flexible beam-diverting device. The above permits a reduction in the machining time by a factor of 10 without reducing the quality of the machining.

9 Claims, 1 Drawing Sheet

U.S. PATENT DOCUMENTS

| | | | |
|---|---|---|---|
| 5,434,880 A * | 7/1995 | Burrows et al. | 372/69 |
| 5,760,365 A * | 6/1998 | Milewski et al. | 219/121.64 |
| 6,087,625 A | 7/2000 | Iso | |
| 6,329,635 B1 * | 12/2001 | Leong et al. | 219/121.83 |
| 6,646,225 B1 * | 11/2003 | Wang et al. | 219/121.64 |
| 6,914,213 B2 * | 7/2005 | Alips et al. | 219/121.64 |
| 7,123,632 B2 * | 10/2006 | Wais et al. | 372/15 |
| 2001/0045419 A1 * | 11/2001 | Dunsky et al. | 219/121.76 |

FOREIGN PATENT DOCUMENTS

| | | |
|---|---|---|
| JP | 11-47967 A | 2/1999 |
| JP | 2000-301374 A | 10/2000 |
| JP | 2002-178178 A | 6/2002 |
| WO | WO 99/08829 A1 | 2/1999 |

OTHER PUBLICATIONS

JP 2000-301374 A, Oct. 2000, Iso et al—Machine Translation Document Listed on IDS.*

* cited by examiner

METHOD FOR THE LASER MACHINING OF COATED SHEETS

CROSS REFERENCE TO RELATED APPLICATION

This application is a national stage of PCT/EP2003/002927 filed Sep. 3, 2003 and based upon DE 102 41 593.5 filed Sep. 5, 2002 under the International Convention.

BACKGROUND OF THE INVENTION

1. Field of the Invention

The invention relates to a method for the laser machining of coated sheets. A method of this type is already known from DE 44 07 190 A1.

2. Related Art of the Invention

With many coated sheets, in particular zinc-coated sheets as used in the automobile industry, the coating material has a markedly lower boiling point than the melting point of the sheet material. When sheets of this type are laser-welded in a lap joint, this leads to explosive vaporizations of coating material, which seriously affect the quality of the joint.

In order to improve the joint quality, it has already been proposed to use spacers to create narrow gaps between the sheets, into which the vaporized coating material can escape. Suitable crater-shaped spacers can be generated, according to JP 11-047967, by laser bombardment of the surface. According to DE 44 07 190 A1, knurling-type spacers can be produced by means of a laser scanner device.

The primary drawback in this is the relatively long time necessary for the machining, which, especially in mass production, creates considerable costs.

SUMMARY OF THE INVENTION

The object of the present invention therefore consists in lowering the machining time necessary for the production of spacers, whilst at least maintaining, preferably improving, the quality of the machining.

The invention is depicted, in relation to the method for the laser machining of coated sheets, in a method in which, on at least one side of at least one sheet, at least one topographical change protruding from the surface is generated by means of a laser directing a laser beam onto the surface by means of a scanner device, characterized in that the laser beam generates the at least one topographical change on that side of the at least one sheet which faces away from said beam, by continuously fusing or melting through this sheet in the region of its machining area, and/or in that the laser beam describes about the center of its machining area a narrowing spiral.

In respect of the method to be provided, the object is achieved according to the invention by the fact that the laser beam is directed onto the surface by means of a scanner device. A scanner device is a particularly fast and flexible steel-deflecting device, for example a mirror system (consisting of at least one pivotable mirror which can be driven on a single-axis or multi-axis basis), or else acousto-optical modulators.

The great advantage of the method according to the invention over that which is proposed in JP 11-047967 consists in the fact that the scanner device is moved evenly relative to the surface of a sheet and, at the same time, the scanner device directs the laser beam onto one machining area for a brief machining period and then very quickly redirects it to another machining area. The times which are necessary for the repositioning of the laser beam are thereby almost fully eliminated, allowing the laser system to be put to very effective use.

Contrastingly, in a conventional laser system, as is used, for example, in JP 11-047967, a laser beam is directed onto the machining area by means of a rigid lens system. For transfer to a second machining area, the lens system has to be moved relative to the structural element, during which time the laser must be switched off. According to the invention, furthermore, the position and arrangement of the topographical changes are freely programmable within the working range of the laser scanner. In comparison with the rigid lens system, the laser scanner does not have to be positioned over the individual topographical changes, but can advantageously be guided on an optimized path between the topographical changes. These differences result in very different necessary machining times: using a laser scanner, it is possible to generate 30 suitable topographical changes in about 0.3 seconds; a conventional system requires about 10 times the machining time.

In one advantageous embodiment of the method according to the invention, the laser beam is not focused upon the surface. Preferably the focus is situated at such a distance from the surface of the sheet to be machined that the irradiation area of the laser on the surface exceeds the focal area thereof by at least 50 percent, preferably 200 percent. The entire machining area is covered by moving the irradiation area by means of minimal redirection of the laser beam. Such areal warming standardizes the fusion or melting process for coating and sheet and promotes the formation of suitable topographical changes.

In a further advantageous embodiment of the method according to the invention, the laser beam generates the at least one topographical change on that side of the at least one sheet which faces away from said beam, by continuously fusing or melting this sheet in the region of its machining area. To this end, a suitable machining or processing time up to the point of penetration shall be pre-specified, or else a penetration sensor provided which regulates the machining time. This embodiment allows the method to be further speeded up if a plurality of sheets are welded together. In the method according to JP 11-047967, a single sheet is firstly aligned and then topographical changes are made to this sheet, whereafter a further sheet is supplied and aligned relative to the first and then the two are pressed together and welded together. It is more advantageous, however, to align the two sheets jointly without contact pressure. In the absence of contact pressure, a minimal gap, which is sufficient for most applications, remains between the sheets, though it can also be assured by means of a suitable aligning apparatus. After this, topographical changes according to this advantageous embodiment of the inventive method are introduced through one, or even both of the sheets. Next, the sheets are pressed together and welded together. In view of the high speed of the scanner device and the generation of the topographical changes, the saving of one alignment process implies a very substantial time saving.

It is also advantageous if the laser beam 3 is guided by the scanner device in such a way that it describes about the center of its machining area a narrowing spiral 5. This allows, especially in the case of shoot-through machining, more even fusion or melting and cooling processes and thus the formation of a topographical change in the form of an evenly contoured elevation 6. The height of the topographical change can be measured or monitored using, for example, an electrical contact sensor 7.

In a further advantageous embodiment of the method according to the invention, at least one further sheet is brought into contact with the at least one coated sheet in such a way that the at least one protruding topographical change causes the formation of at least one gap between the at least two sheets, and that the at least two sheets, in the region of the at least one gap, are welded together in such a way that vaporization products formed in the process can escape into the at least one gap. The escape facility for the vaporization products ensures a substantially higher quality of weld seam.

In another advantageous embodiment of the method according to the invention, the at least two sheets are welded together in such a way that the resultant weld seam at least partially overlays the at least one topographical change previously generated.

Each such topographical change constitutes an injury to the coating, since this, due to the laser irradiation, vaporizes, leaving behind the bare sheet material. In automobile construction, a zinc coating, in particular, is used as corrosion protection. Any injury can constitute a seed for future corrosion. Although a weld seam also constitutes such an injury, it is vital to the joint. The fact that the weld seam is drawn over the topographical changes and at least partially replaces them means that the number of possible corrosion seeds is reduced and hence the corrosion risk diminished. For a subsequent anti-corrosion treatment, especially galvanization, the shape of the topographical changes is crucial: According to the invention, an evenly contoured mountain is formed, according to JP 11-047967 a crater is formed. A mountain has a smaller surface than a crater formed from the same quantity of material, and thus a smaller area of attack from corrosion. In addition, a mountain can also be galvanized all the way round between two sheets, whereas a crater is covered by the above-lying sheet and cannot be galvanized on the inside. Moisture can get inside the crater as the sheets are joined together, and the topographical change becomes the corrosion seed.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 1:
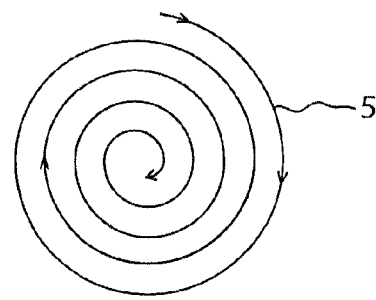
FIG. 1 shows an inward narrowing spiral.
Figure 2:
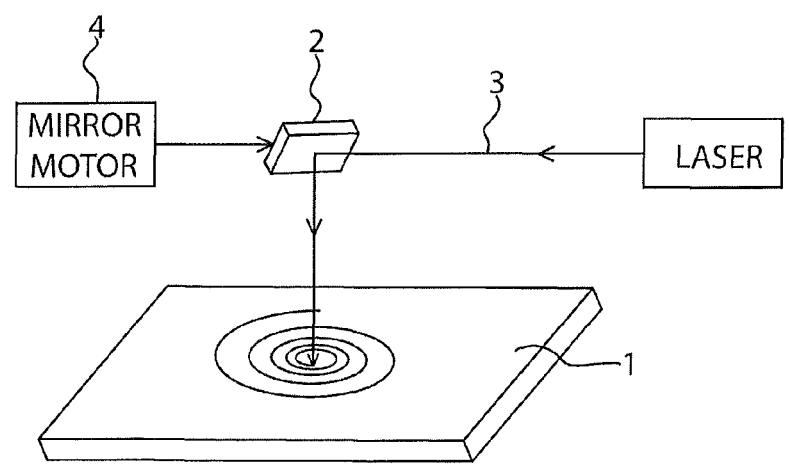
FIG. 2 depicts a laser beam guided by a mirror to move in a narrowing spiral pattern.
Figure 3:
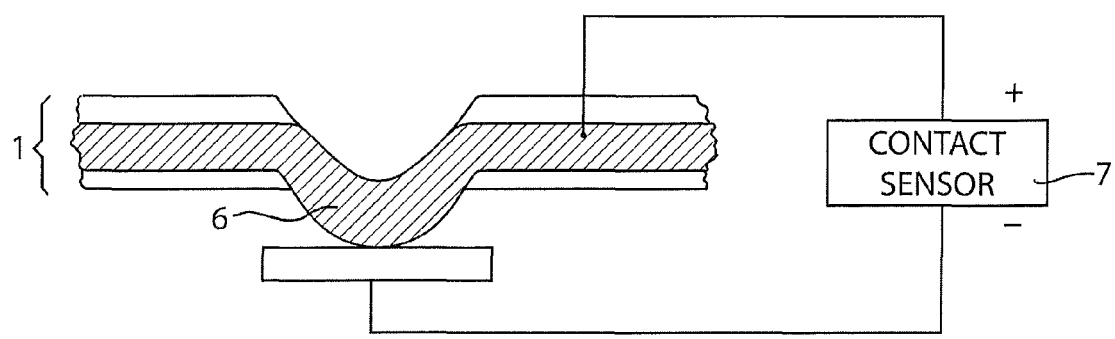
FIG. 3 shows a topographic change detected using an electrically conductive contact sensor.

The method according to the invention is explained in greater detail below with reference to two illustrative embodiments:

In a first illustrative embodiment, a coated sheet 1 is aligned, a scanner device 2 is moved evenly over it and directs a laser beam 3 onto a plurality of machining areas one after the other. The scanner device consists of a computer-controlled mirror system 4 which is pivotable in two dimensions. The scanner device has approx. 320 mm distance to the surface of the sheet, the laser focus is situated about 20 mm before the surface. The defocusing of the laser beam produces an areal and even warming of the machining area. This results in a more even vaporization of the coating and the formation of a topographical change in the form of an evenly contoured mountain. Following generation of the required number of topographical changes, a second sheet is supplied and aligned, whereafter the two are pressed together and welded together.

In a second illustrative embodiment, two coated sheets are aligned one above the other at a distance apart. A scanner device is moved evenly over them and directs a laser beam onto a plurality of machining areas one after the other. The scanner device consists of a computer-controlled mirror system which is pivotable in two dimensions. The scanner device has approx. 305 mm distance to the surface of a sheet, the laser focus is situated about 4-7 mm before the surface. The laser beam is guided by the scanner device in such a way that it describes about the center of its machining area a narrowing spiral. The defocusing of the laser beam produces an areal and even warming of the machining area. As a result of the spiral movement from outer to inner, a more even formation of the topographical change on that side of the sheet facing away from the laser is realized, in the form of an evenly contoured mountain. Following generation of the required number of topographical changes, the two sheets are pressed together and welded together. The weld seam is herein guided at least over some of the topographical changes.

In the embodiments of the examples described above, the method according to the invention proves especially suitable for the laser-welding of coated sheets in the automobile industry.

In particular, considerable advantages in terms of the machining time can thus be obtained. Yet the corrosion protection can also be enhanced by the improved shape of the topographical changes and by the guidance of the weld seam over at least a part of the topographical changes.

The invention is not limited to the illustrative embodiments previously portrayed, but can rather be transferred to other ones as well.

It is thus conceivable, for instance, to form the scanner device, instead of by a mirror system, by acousto-optical modulators. It is further possible, instead of guiding the laser scanner over the surface of the structural element, to move the structural elements beneath a fixed scanner. Where appropriate, scanner and structural element can perform a mutually coordinated movement.

The distance of the scanner device from the sheet and the degree of defocusing are also non-critical and can be matched, where necessary, to the laser output for example, or even to the sheet and/or coating material. In addition, it may be advantageous to suitably vary the laser output during the irradiation.

The invention claimed is:

1. A method for laser machining a coated sheet, comprising:
   placing a coated sheet having first and second surfaces near a laser such that one surface of the sheet faces the laser and the other surface of the sheet faces away from the laser; and
   generating on the surface of the coated sheet which faces away from said laser at least one topographical change protruding from the surface by directing the laser beam onto the sheet and guiding the laser beam to describe an inward narrowing spiral, whereby the laser beam generates the at least one topographical change protruding from
   the surface of the sheet which faces away from said beam, by melting through this sheet, and
   wherein the topographical change protrudes from the surface a height sufficient to provide a spacing gap between the coated surface on which the topographical change was formed and a sheet to which the coated sheet is to be welded sufficient to permit vaporization products formed in the welding process to escape through the at least one gap.

2. The method as claimed in claim 1, wherein the laser beam is a focused laser beam having a focus and a focal area at said focus, and wherein the focus of the laser beam focus is situated at such a distance from the surface of the sheet to be machined that the irradiation area of the laser on the surface exceeds the focal area thereof by at least 50 percent.

3. A method for laser machining a coated sheet, comprising:
   placing a coated sheet having first and second surfaces near a laser such that one surface of the sheet faces the laser and the other surface of the sheet faces away from the laser; and
   generating on at least one coated surface of the coated sheet at least one topographical change protruding from the surface by directing the laser beam onto the sheet and guiding the laser beam to describe an inward narrowing spiral, whereby the laser beam generates the at least one topographical change protruding from the surface of the sheet which faces away from said beam, by melting through this sheet;
   bringing at least one further sheet into contact with the sheet formed in (a) or (b) in such a way that the at least one protruding topographical change causes the formation of at least one gap between the coated sheet and the at least one further sheet, and
   welding the coated sheet and the at least one further sheet together in the region of the at least one gap in such a way that vaporization products formed in the process escape through the at least one gap.

4. The method as claimed in claim 3, wherein the at least two sheets are welded together to form a weld seam, and wherein said weld seam at least partially replaces the at least one topographical change previously generated.

5. The method as in claim 1, wherein the surface from which said least one topographical change protrudes is the laser beam facing surface.

6. The method as in claim 1, wherein the surface from which said least one topographical change protrudes is the surface of the sheet which faces away from the laser beam.

7. The method as in claim 1, further comprising:
   controlling said melting through by
   (a) pre-specifying the laser processing time or
   (b) providing a penetration sensor which senses the formation of the protrusion and regulates the machining time of the laser in response to the detection of the protrusion.

8. The method as in claim 7, wherein prior to formation of said topographical changes two sheets are aligned to each other for welding, the alignment being without contact pressure, and wherein after alignment said topographical changes are introduced through at least one sheet, said method further comprising the subsequent steps of:
   pressing the aligned sheets together, and
   welding the aligned and pressed sheets together.

9. A method for laser machining a coated sheet, comprising:
   placing a coated sheet having first and second surfaces near a laser such that one surface of the sheet faces the laser and the other surface of the sheet faces away from the laser; and
   generating on the laser beam facing coated surface of the coated sheet at least one topographical change protruding from the surface by directing the laser beam onto the sheet and guiding the laser beam to describe an inward narrowing spiral, whereby the laser beam generates the at least one topographical change, and
   wherein the topographical change protrudes from the surface a height sufficient to provide a spacing gap between the coated surface on which the topographical change was formed and a sheet to which the coated sheet is to be welded sufficient to permit vaporization products formed in the welding process to escape through the at least one gap.

* * * * *